United States Patent [19]

Altenpohl

[11] Patent Number: 4,498,578
[45] Date of Patent: Feb. 12, 1985

[54] EASY-DROP SIZING CARRIER FOR POULTRY

[75] Inventor: Paul J. Altenpohl, High Point, N.C.

[73] Assignee: W. F. Altenpohl, Inc., High Point, N.C.

[21] Appl. No.: 346,216

[22] Filed: Feb. 5, 1982

[51] Int. Cl.³ .............................................. B65G 17/32
[52] U.S. Cl. ..................................... 198/680; 17/44.1; 198/483
[58] Field of Search ............... 198/680, 477, 478, 483, 198/484; 17/44.1, 44, 24

[56] References Cited

U.S. PATENT DOCUMENTS

| 3,708,829 | 1/1973 | Klevgard | 17/44.1 |
| 4,094,041 | 6/1978 | Steed | 17/44.1 |
| 4,178,659 | 12/1979 | Simonds | 198/680 |
| 4,339,848 | 7/1982 | Meyn | 17/44.1 |
| 4,341,161 | 7/1982 | Morita et al. | 198/680 |
| 4,351,087 | 9/1982 | Altenpohl et al. | 17/44.1 |

FOREIGN PATENT DOCUMENTS 111255 7/1968 Denmark ............................. 17/44.1

Primary Examiner—Joseph E. Valenza
Assistant Examiner—Daniel R. Alexander
Attorney, Agent, or Firm—Harvey B. Jacobson

[57] ABSTRACT

A poultry load is pivotally suspended by a hook from a carrier body in a travel position without latching and is displaced to a load releasing position by a signal operated mechanism during travel of the carrier body along a conveyor path. A stop bar engages the load during displacement of the hook to the releasing position for load drop purposes.

2 Claims, 3 Drawing Figures

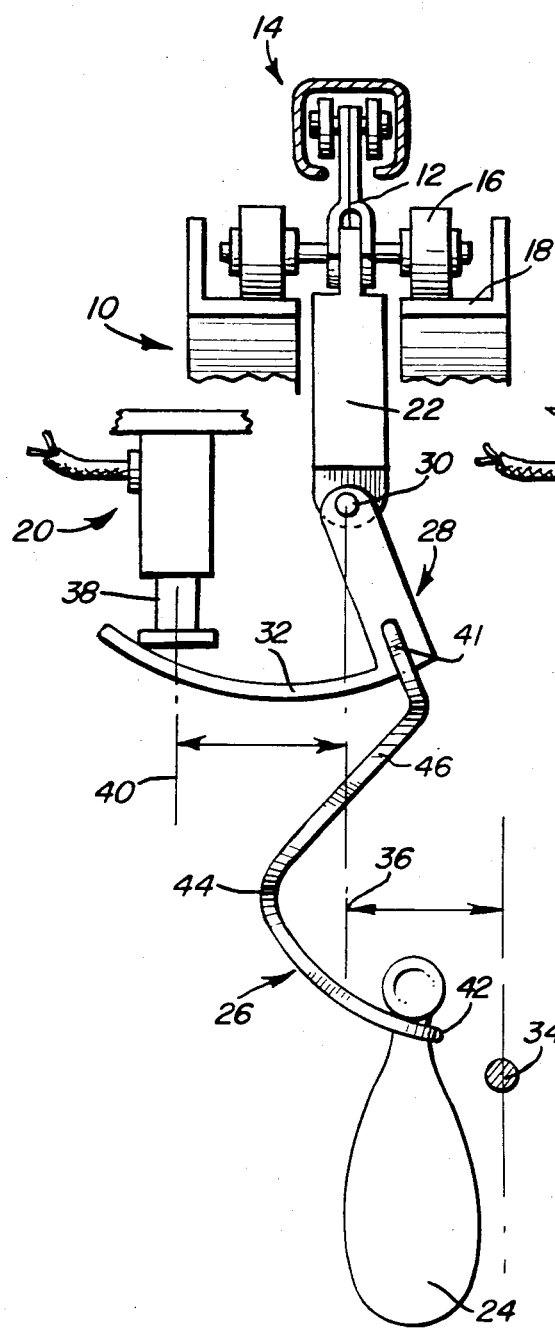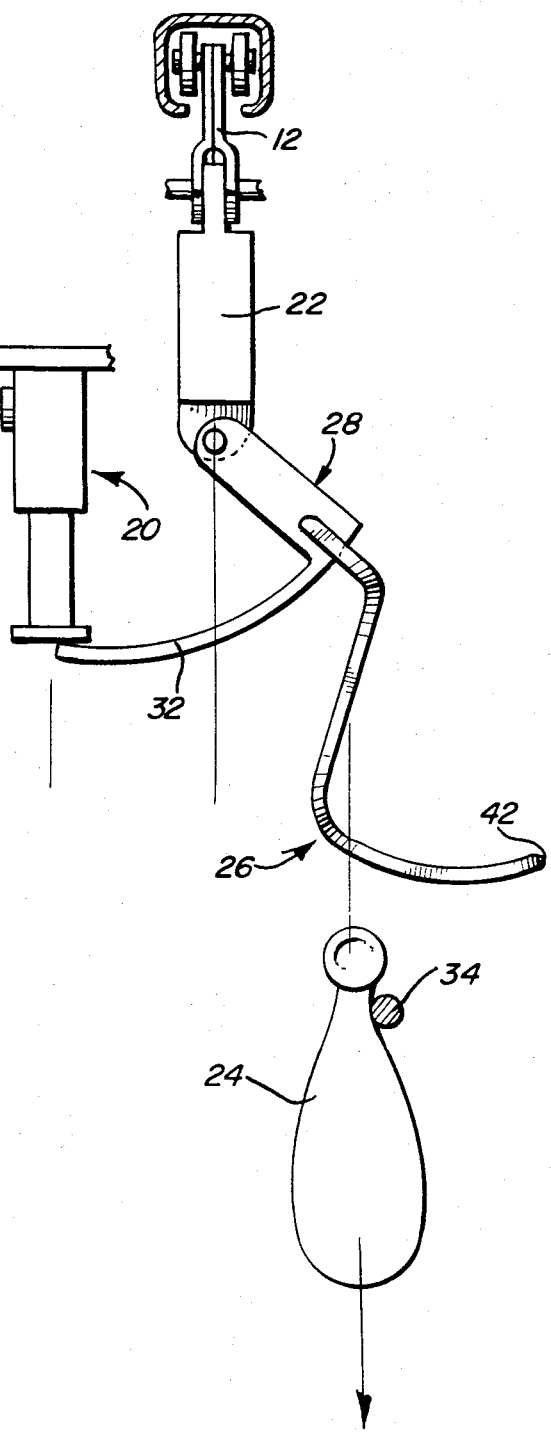

EASY-DROP SIZING CARRIER FOR POULTRY

BACKGROUND OF THE INVENTION

The use of vertically elongated poultry carriers having hooks from which loads are suspended during travel along a conveyor path through a weight sorting station, are well known. This invention relates to an improvement to such poultry handling equipment.

The suspension of poultry from carrier hooks during travel through a weight sorting station and release of the load from such hooks by means of a signal-operated release mechanism is disclosed for example in U.S. Pat. No. 3,291,303. In such poultry handling equipment, the loaded hook is held in a travel position on the carrier by some latch device that is released by the signal-operated mechanism to enable gravitational displacement of the hook by the load to a load releasing position.

Other types of poultry releasing methods are also known, wherein the load is positively pushed off the hook by the load releasing mechanism. Also, positive camming of the hook to a release position is known as disclosed for example in U.S. Pat. No. 3,708,829. A combination of hook camming and stop bar pushing of the load off the hook for load transfer purposes is furthermore disclosed in U.S. Pat. No. 4,178,659.

The load releasing function associated with the prior art poultry handling equipment requires certain structural features and configurations producing problems relating to production reliability or "hang-up", create cleaning difficulties and increase equipment manufacturing costs. It is therefore an important object of the present invention to provide a novel load releasing poultry carrier arrangement that is simple in construction, reliable in operation and easy to clean.

SUMMARY OF THE INVENTION

In accordance with the present invention poultry loads are suspended by vertically elongated carriers, link connected to an overhead conveyor, for travel through a weight sorting station with which a signal-operated load release mechanism is associated, each carrier supporting its load by means of a hook pivotally suspended from the carrier body in a travel position without latching or other restraint. The travel position of the hook will accordingly depend on its geometry and mass distribution as well as the weight of its load. In such a free suspension position, the load during travel will be closely spaced from a stop bar fixedly mounted at the weight sorting or sizing station parallel to the travel path and just below the lower end of the hook.

Associated with the hook is a laterally extending actuating arm through which the load release mechanism applies a momentary displacing force causing lateral swing of the hook and load toward the stop bar. The hook forms a closed loop at its lower end at which the load is engaged so that the load is pushed off the hook by impact with the stop bar in response to said swing of the hook laterally of the travel path. The sides of the hook diverge at an upward incline from the lower end in order to gravitationally maintain engagement of the load with the hook during travel as well as to accommodate its release from the hook by the stop bar.

The actuating arm extending laterally from the hook not only affects its center of gravity for proper positioning of the load during travel but also dictates lateral spacing of the load release mechanism from the travel path to avoid any interference with the carrier. The affect of the actuating arm on the center of gravity of the hook is such that once the load is released, the hook will virtually remain pivotally suspended from the carrier body in the load releasing position thereby minimizing return swing of the hook after load release.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 2 is a side section view taken substantially through a plane indicated by section line 2—2 in FIG. 1.

FIG. 3 is a partial side section corresponding to a portion of FIG. 2 showing the poultry carrier in a load releasing position.

DETAILED DESCRIPTION OF PREFERRED EMBODIMENT

Figure 1:
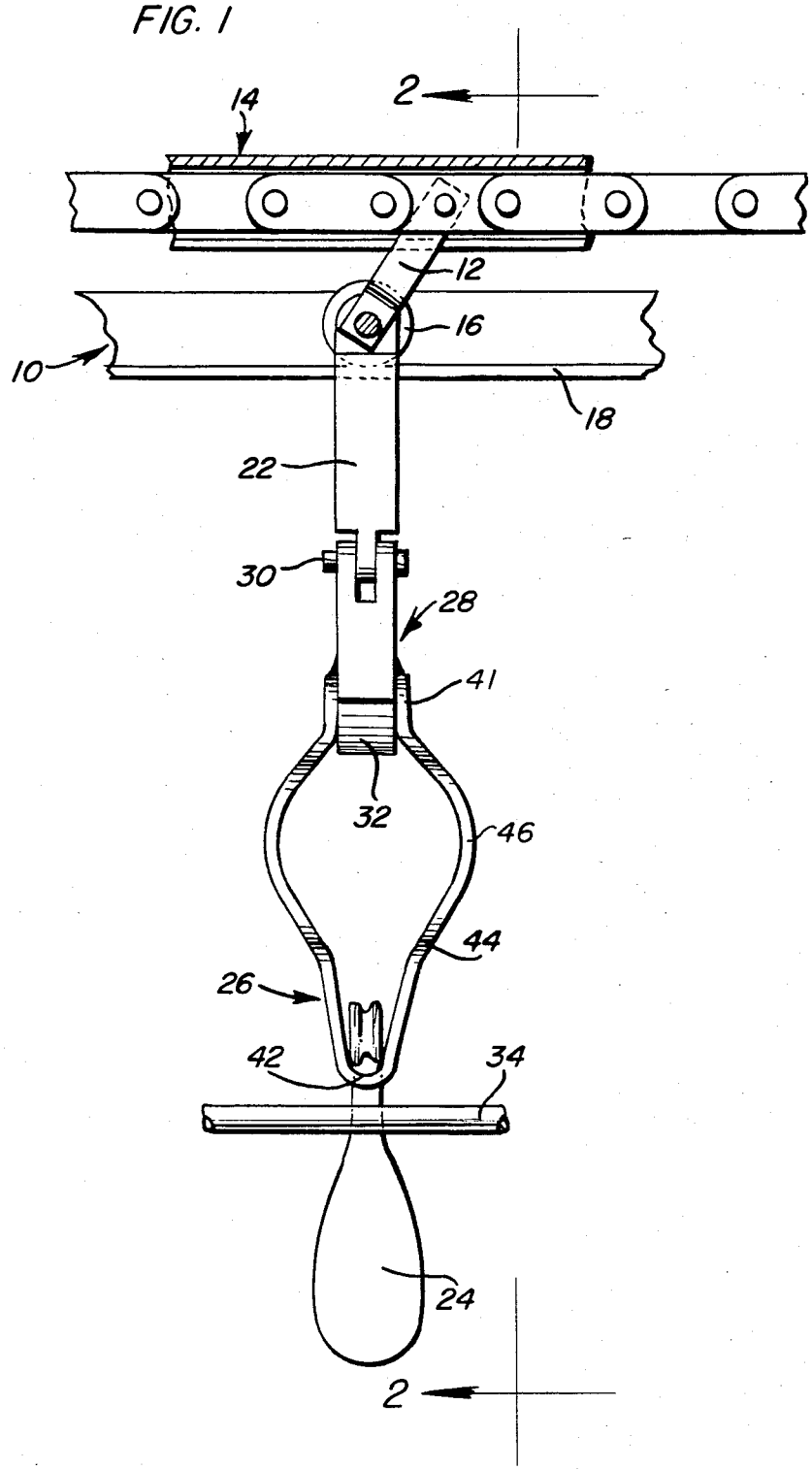
FIG. 1 is a partial side elevation view of a poultry handling load releasing carrier system in accordance with the present invention.

Referring now to the drawings in detail, FIGS. 1 and 2 show one of a plurality of spaced poultry load carriers 10 connected by a pulling link 12 to an overhead conveyor 14 for movement along a predetermined travel path. In the embodiment shown, the load carriers are also supported by rollers 16 on a split type stationary track 18 during travel through a weight sizing or sorting station with which a signal-operated release mechanism 20 is associated. The rollers are mounted by axles connected to the upper end of a rod-like carrier body 22, to which the pulling link 12 is pivotally connected. The release mechanism 20 is fixedly mounted in laterally spaced relation to the travel path of the carriers from which poultry loads 24 are suspended.

With continued reference to FIGS. 1 and 2, the poultry load 24 is shown supported on a hook or shackle frame member 26 connected at its upper portion to a hook mounting member 28 in accordance with the present invention to form a rigid assembly therewith. The member 28 is pivotally connected by a pivot pin 30 to the lower end of the carrier body 22 and is provided with a laterally extending actuating arm 32 at its lower end from which the hook member depends. The actuating arm 32 is adapted to be engaged by the signal operated release mechanism 20 as the carrier 10 travels through a weight sorting station. At the weight sorting station, a stop bar in the form of a guide rod 34 is fixedly mounted generally parallel to the travel path of the carriers. Prior to engagement of the actuating arm 32 by the release mechanism 20, the load 24 is pivotally suspended from the carrier body 22 without any restraint or latching by means of the hook 26 and hook mounting member 28 from which the hook depends. In this freely suspended condition the load 24 assumes a lateral position relative to the travel path as shown in FIG. 2 closely spaced between the vertical axis 36 extending longitudinally through the carrier body 22 and the stop bar 34. The stop bar 34 is also disposed just below the hook member 26 to avoid any contact therewith, and on one side of the vertical axis 36 opposite the release mechanism 20.

The release mechanism 20 is of any well known type, either fluid operated or electromagnetically operated, to effect downward displacement of a plunger element 38 from a retracted position as shown in FIG. 2 through a predetermined stroke along a fixed axis 40 parallel to the axis 36. The lateral spacing between the release mechansm and the carrier 10 is such as to avoid interference with carrier travel and yet enable the plunger element 38 to engage the end of actuating arm 32 in response to a load release signal generated in a manner well known in the art. When actuated, the plunger element 38 momentarily applies a displacing force to the actuating arm 32 to displace the hook member 26 to a load releasing position as shown in FIG. 3. Such lateral swing of the hook member carries the load into contact with the stop bar 34 for positive disengagement or release of the load from the hook member. The load will therefore drop into a receiver (not shown).

The hook member 26 is made of a rigid rod formed into a closed loop. Opposite side ends 41 of the rod are secured as by welding to the member 28 from which the sides of the hook diverge toward points 46 of maximum width as shown in FIG. 1. From points 46 the sides of the hook member converge toward a lower end point 42 at which the hook member engages the load 24. The sides of the hook also extend at an angle to the upper ends 41 in one lateral direction relative to axis 36 toward intermediate points 44 as shown in FIG. 2. The hook sides converge from points 44 toward lower end point 42 at a downward incline in the other lateral direction. Thus, displacement of the load 24 by impact with the stop bar 34 just below the lower end point 42 of the hook member causes disengagement of the load from the diverging sides of the hook. As shown, it is the leg of the poultry load which is engaged by the hook member and is readily released when pushed by the stop bar away from the lower end point 42.

The hook mounting member 28 with the actuating arm extension 32 and the hook member 26 form a rigid assembly pivotally and freely suspended from the carrier body by pivot pin 30. The configuration and mass distribution for such rigid assembly is such that it will support a poultry load within a given weight range in the freely suspended position shown in FIG. 2 spaced from the stop bar 34. A displacing force applied by the release mechanism 20 to actuating arm 32 will therefore effect the load releasing action hereinbefore described, after which the hook member will undergo minimal, if any, return movement in view of the shift in the center of gravity caused by release of the load. The lateral extension of the actuating arm 32 enables the release mechanism to exert its displacing force on the hook member from a location avoiding interference and also cooperates to establish the necessary mass distribution to locate its center of gravity for operative positioning of the load during travel without any latching or other restraint and to minimize any return swing of the unloaded hook from the release position shown in FIG. 3.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a conveyor, a plurality of load carriers operatively connected to the conveyor for travel along a conveyor path, hook means for suspending loads from the carriers, and load release means mounted in laterally spaced relation to the conveyor path, the improvement residing in hook mounting means pivotally connecting each of the hook means to the carriers for supporting the loads in a free suspension position during travel, actuating means engageable by the load release means for lateral displacement of the hook means relative to the conveyor path from said free suspension position to a releasing position, and stop means spaced from the loads and engageable therewith in response to said lateral displacement of the hook means for limiting lateral movement of the loads during approach of the hook means to the releasing position and release of the loads therefrom, each of said hook means comprising a closed-loop rod element having a lower end portion diverging in an upwardly inclined direction in the free suspension position, said actuating means comprising an actuating member rigidly connected to the hook mounting means and extending laterally therefrom relative to the conveyor path, said actuating means maintaining the hook means in the releasing position when unloaded and in the free suspension position laterally spaced from the stop means prior to said engagement by the load release means when loaded.

2. The improvement as defined in claim 1 wherein said stop means comprises a rigid guide bar extending generally parallel to the conveyor path of the carriers.

* * * * *